United States Patent

[11] 3,598,110

| [72] | Inventor | Karl W. Edmark<br>Seattle, Wash. |
|---|---|---|
| [21] | Appl. No. | 815,134 |
| [22] | Filed | Apr. 10, 1969 |
| [45] | Patented | Aug. 10, 1971 |
| [73] | Assignee | Physio Control Corporation<br>Seattle, Wash. |

[54] VENTRICULAR ARRHYTHMIA DETECTION SYSTEM
3 Claims, 2 Drawing Figs.

| [52] | U.S. Cl. | 128/2.06 A |
|---|---|---|
| [51] | Int. Cl. | A61b 5/04 |
| [50] | Field of Search | 128/2.05 P, 2.05 R, 2.05 S, 2.05 T, 2.00 A, 2.00 B, 2.00 F, 2.00 G, 2.00 R |

[56] References Cited
UNITED STATES PATENTS

| 3,132,208 | 5/1964 | Dymski | 128/2.05 S |
|---|---|---|---|
| 3,144,019 | 8/1964 | Haber | 128/2.06 A |
| 3,267,933 | 8/1966 | Mills et al. | 128/2.06 A |
| 3,267,934 | 8/1966 | Thornton | 128/2.06 A |
| 3,463,143 | 8/1969 | Kavsh | 128/2.06 A |

FOREIGN PATENTS

| 911,078 | 11/1962 | Great Britain | 128/2.06 A |
|---|---|---|---|

*Primary Examiner* — William E. Kamm
*Attorney* — Christensen & Sanborn

ABSTRACT: A system is disclosed for detecting the occurrence of a premature ventricular contraction in a patient or in the signals provided by a training apparatus which generates signals representing a premature ventricular contraction (PVC). The electrocardiograph signals from the patient or a training apparatus are applied via differentiating circuit and filter circuit to a logic system which operates to analyze the QRS signals to determine whether or not the QRS signal is a normal signal or whether it is the result of a PVC. Pulse generating circuits are used to define timing arrangements so that if the signal is the result of or represents a PVC then an alarm circuit is activated. Details of the logic circuitry and of a system wherein horizontal markers are provided on the cathode-ray tube display of the QRS signal to facilitate utilization of the equipment by a person unskilled in the electronic arts are provided.

INVENTOR
KARL W. EDMARK
BY Christensen Sanborn & Matthews
ATTORNEYS

VENTRICULAR ARRHYTHMIA DETECTION SYSTEM

A need exists at the present time for monitoring the electrocardiograph signals of a patient so that the occurrence of a premature ventricular contraction will be detected. With the advent of devices and systems for training persons to recognize an arrhythmia pattern, a need has also arisen for apparatus to monitor the ECG signals generated to represent a PVC condition.

It is thus an object of the present invention to provide an arrhythmia detection system. A further object of the present invention is to provide a system for monitoring the ECG signals of a patient or of a training apparatus and to provide a visual or audible indication that a signal corresponding to or generated by a premature ventricular contraction has occurred.

An additional object of the present invention is to provide a PVC detection system which operates in combination with a cathode-ray tube ECG monitoring system to provide a visual indication to the operator that the equipment is operating properly and that the adjustments for correct comparison of a normal QRS signal to an abnormal QRS signal have been properly established.

A further object is to provide a system for carrying out the preceding objects and also being useful for detecting and counting normal QRS signals as well as tachycardia.

The above as well as additional advantages and objects of the invention are achieved through the use of a system wherein ECG signals are applied to a differentiating and filtering circuit for removal of substantially all but the QRS portion of the ECG signal. The QRS signal is then applied to a first single-shot multivibrator circuit having a settable output pulse width. The width of the pulse from the first single-shot circuit is adjusted to define a time corresponding to the normal time for the QRS signal of a given patient to occur. A second single-shot multivibrator circuit responsive to the first single-shot circuit is coupled with the horizontal deflection circuitry and the beam intensity circuitry of an ECG monitoring scope to cause a small horizontal blip on the face of the scope at a selected point on the trace of the QRS wave. The first single-shot circuit also applies an inhibit signal to a gate associated with the visual and audible signal generating apparatus to prevent the operation thereof so long as the first single-shot circuit is in its pulse output mode.

A third single-shot multivibrator circuit coupled with the ECG input circuitry responds to the negative-going portion of the QRS signal when it reaches a predetermined amplitude to provide an input pulse to a fourth pulse responsive one shot multivibrator circuit. The fourth single-shot circuit applies a signal to the gate controlled by the first single-shot (or monostable) circuit. With the duration of the pulse from the first monostable circuit properly adjusted the signal from the fourth monostable circuit will be prevented from activating the alarm system, but will be applied to the beam intensity and horizontal deflection circuitry of the scope to cause a second horizontal blip to appear on the ECG monitoring scope at a point on the trailing portion of the QRS signal. Thus the operator is provided with a visual indication of the time slot defined by the multivibrator circuits and an indication of the amplitude at which the QRS signal is being monitored. Thus the operator is assured that triggering is not being caused at a "P" or a "T" wave.

When a PVC signal occurs the slope and duration of the signal will be such that the first monostable circuit will have completed its output pulse prior to the time when the negative-going portion of the QRS signal triggers the fourth multivibrator. As a result the gate normally inhibited by the pulse from the first single-shot circuit will be open and a signal from the first single-shot circuit will be open and a signal from the fourth single-shot circuit will be applied to the alarm system. The alarm system includes a visual indicator, an audible signal generator, as well as a counter and display unit for accumulating the count of PVCs occurring subsequent to the last resetting of the counter and display unit.

The invention will be more clearly understood from the following description when read with reference to the accompanying drawings.

Figure 1:
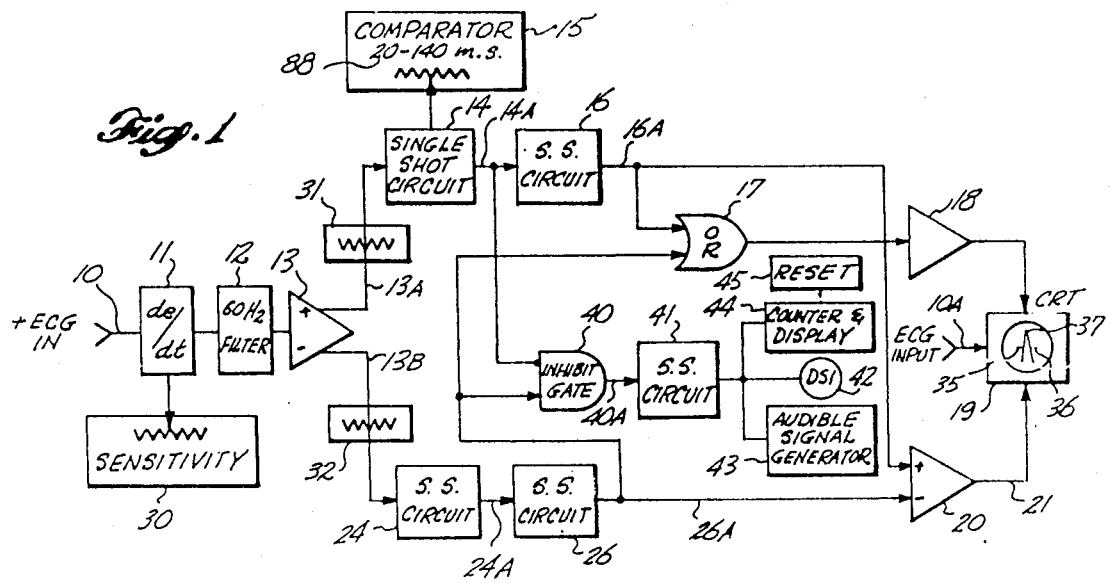
FIG. 1 is a block diagram illustrating the presently preferred embodiment of the invention.

Referring now to the drawings and in particular to FIG. 1 it will be seen that an ECG signal input circuit 10 adapted to receive ECG signals from a patient or from a training system applies the same to the differentiating circuit 11 having its output circuit coupled with the 60-cycle filter 12. An amplifier 13 coupled with the filter 12 is provided with a frequency response characteristic such that it operates essentially as a band-pass amplifier providing output signals on its output leads 13A and 13B. The circuits 11, 12 and 13 serve to remove substantially all but the QRS signals from the ECG input signals.

Circuit 13A is connected to the single-shot multivibrator circuit 14 having a pulse duration adjustment circuit 15 labeled as the comparator circuit 15. The output circuit 14A of one shot circuit 14 is applied to a second single-shot multivibrator 16 which is triggered by the rising edge of the output pulse from the circuit 14. In the specific system illustrated the second single-shot circuit 16 has its output circuit 16A applied via the OR gate 17 to the amplifier 18 which in turn controls the beam intensity of the cathode ray tube 19. Circuit 16A is also applied to the amplifier 20. Amplifier 20 is coupled by its output circuit 21 with the horizontal deflection circuitry of the cathode ray tube 19 in a manner such that a single from the single-shot multivibrator 16 causes the beam of the cathode ray tube to be deflected to the left momentarily in response to the pulse from the single-shot multivibrator 16. As a result, and as explained in greater detail hereinafter, the trace on the scope which is monitoring the ECG signals directly via the input circuit 10A connected therewith undergoes a leftward deflection giving rise to a marker on the QRS wave.

The output circuit 13B from amplifier 13 is coupled with the single-shot multivibrator circuit 24 which has its output circuit 24A connected with the single-shot multivibrator circuit 26. The arrangement is such that the leading edge of the output pulse from the single-shot multivibrator circuit 24 triggers the circuit 26 causing circuit 26 to apply its output pulse via circuit 26A to the amplifier 20 and to the OR gate 17. The single-shot circuit 24 responds to the negative-going portion of the QRS signal and is triggered at a predetermined voltage level as is the single-shot circuit 14. A sensitivity adjustment circuit 30 coupled with the differentiating circuit 11 in effect controls the overall gain of the input circuitry for responding to the ECG input signal. A pair of resistors 31 and 32 connected in the circuits 13A and 13B adjust the level of the signals applied to the single-shot circuits 14 and 24 so that these circuits will trigger at a selected level of the QR and RS portion of the QRS signal, respectively.

When the single-shot circuit 24 is triggered, which in turn triggers circuit 26, the resulting pulse applied via amplifier 20 to the horizontal deflection circuitry of the scope 19 causes a rightwardly extending horizontal blip to occur momentarily on the RS portion of the QRS waveform. It will be readily seen that the operator by adjusting the resistors 31 and 32 can position the horizontal makers 35 and 36 at selected points on the QRS waveform 37.

The circuits 14A and 26A from the single-shot multivibrator circuits 14 and 26 are also applied to the INHIBIT gate 40. The gate 40 is normally open to pass signals from circuit 26A but is inhibited during the occurrence of the signal from circuit 14. The output circuit 40A from gate 40 is connected to the single-shot multivibrator circuit 41 which in turn controls the indicator light 42, the audible signal generator 43, and the counter and display unit 44. A reset control 45 can be monitor a given patient over any selected time interval and provide a running count of the PVC conditions which have occurred subsequent to the last reset of the counter and display unit. The arrangement will be seen to be such that with the circuit 15 adjusted such that the pulse from the single-shot multivibrator 14 is of a width corresponding to the duration of a selected portion of a normal QRS signal, the output signal from the single-shot circuit 26 will be inhibited from passing the gate 40. However when a PVC occurs the pulse from single-shot 26 and thus the alarm circuitry will be triggered.

As a safety feature and to prevent double firing of the alarm circuitry in response to noise during a given period the single-shot circuit 24 holds the single-shot circuit 26 against subsequent firing until the single-shot circuit 24 has completed its cycle. This is particularly important in apparatus of the type disclosed herein since the T portion of the ECG signal might tend to trigger an erroneous count or indication.

Figure 2:
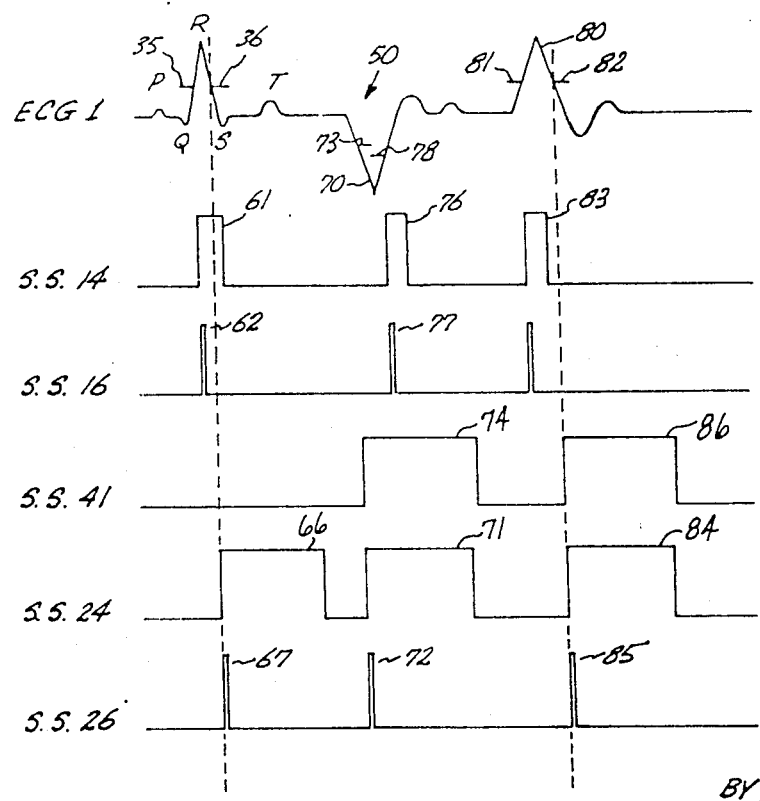
FIG. 2 is a wave-shape diagram which illustrates the manner of operation of the system of FIG. 1.

Turning now to FIG. 2 the system will be better understood by reference to the wave diagrams illustrated therein. The top set of waveforms 50 corresponds to the ECG input signal as seen on the scope 19. Waveform 61 represents an output signal from the single-shot multivibrator 14. It will be seen that the pulse 61 starts when the level of the QRS wave reaches a predetermined amplitude as adjusted by the attenuation circuit 31. The pulse 62 of the waveform associated with single-shot circuit 16 starts substantially simultaneously with the triggering of single-shot 14 and gives rise to the horizontal and leftwardly extending blip 35 on the QRS wave. It will be seen that the width of the pulse 61 from single-shot 14 is adjusted such that when the single-shot circuit 24 is triggered the leading edge of its pulse 66 occurs during the existence of pulse 61. As a result the pulse 67 from the single-shot circuit 26 does not reach the single-shot circuit 41 due to gate 40 being inhibited and hence there is no alarm. However, the pulse 67 is applied to the intensity and horizontal deflection circuitry giving rise to the rightwardly extending horizontal blip 36 on the scope face. The operator is thus provided with a visual indication that the circuit is operating, and also the adjustment of the triggering levels of the circuits 14 and 24 is facilitated due to the horizontal makers 35 and 36 produced on the scope face. Since the P and T waves are also present on the scope face the operator can see that as long as markers 35 and 36 are above the peaks of the P and T waves the P and T signals cannot cause an alarm.

As is well known in the art, the ECG signals provide positive-going QRS signals. That is, it is standard in the art for the monitoring equipment typically used for providing the ECG signals to provide only the positive-going QRS waves in response to a patient's heartbeat. However the occurrence of a ventricular arrhythmia gives rise to either a positive or a negative-going signal such as signals 70 or 80. Since the negative-going signal 70 is by definition considered the result of a premature ventricular contraction, the system should be activated to provide an alarm in response thereto. It will be seen that the signal 70 starts with a negative-going portion and thus single-shot circuit 24 is triggered ahead of circuit 14. This gives rise to the pulse 71 which in turn causes single-shot 26 to generate pulse 72. Pulse 72 not only causes the horizontal blip 73 on the scope face, but also passes through the gate 40 to trigger single-shot circuit 41. As a result the alarm circuitry is activated by the pulse 74. Then as the positive-going portion of signal 70 occurs single-shot circuit 14 generates pulse 76 giving rise to pulse 77 from single-shot circuit 16 and hence the generation of the leftwardly-going horizontal blip 78 on the waveform 70.

For purpose of illustration a further PVC arrhythmia is illustrated as having occurred and having given rise to the waveform 80. When the amplitude of the positive-going portion of the waveform 80 reaches the predetermined triggering level for circuit 14, the circuit is triggered and in the manner previously described the horizontal blip 81 is generated on the scope face. However, it will be seen that the duration of the pulse 83 is such that it terminates before the negative-going portion of the waveform 80 achieves an amplitude corresponding to that required for triggering the single-shot circuit 24. Thus when the single-shot circuit 24 is triggered to provide the pulse 84, the pulse 85 generated by the single-shot circuit 26 causes circuit 41 to be triggered. Pulse 86 is thus applied to the alarm circuitry, and the horizontal marker 82 caused by signal 85 is provided on the scope face in the manner previously described.

It has been determined that the single-shot circuit 14 is advantageously adjusted to trigger on the rising portion of the QRS curve at approximately the midpoint thereof. The duration of QRS signals usually varies between 40 and 120 milliseconds whereas a PVC signal is greater that 120 milliseconds in duration. Thus in one preferred embodiment of the invention single-shot circuit 14 is adjustable between 20 and 140 milliseconds, single-shot circuit 16 and single-shot circuit 24 each provide one millisecond pulses, single-shot 24 provides a 200 millisecond pulse, and single-shot circuit 41 provides a 200 millisecond pulse. It is obvious that the specific time durations could be adjusted without departing from the inventive concepts since the single-shot circuit 14 effectively defines a time slot corresponding to a normal QRS signal with the signal from the single-shot circuit 26 occurring inside this time slot for a normal QRS signal and outside of this time slot during occurrence of a premature ventricular contraction. The comparator 15 is calibrated on its face with markings 88 representing the pulse width in milliseconds so that the operator can readily set the system in accordance with the "normal" QRS time duration for a given patient. It will also be seen that the system can also be used for counting all QRS signals by setting the duration of the pulse from circuit 14 for the shortest duration thereof. Then each triggering of circuits 24 and 26 will be counted.

In practice the operator adjusts circuits 30, 31, and 32 to get the markers 35 and 36 at the proper points on the QRS wave. Then circuit 15 is adjusted to reduce the duration of pulse 61 until an alarm is given for pulse 67 generated by a normal QRS signal. Then by slightly advancing the setting of circuit 15 to slightly increase the width of pulse 61, no alarm results from a normal QRS signal and the system is set to detect PVC signals.

While the invention has been disclosed by reference to the presently preferred embodiment it will be recognized that various modifications can be made without departing from the basic inventive concepts.

What I claim is:

1. A system for monitoring electrocardiograph signals comprising in combination: signal input means for receiving electrocardiograph input signals which include QRS signals; a first signal-generating means connected to said signal input means and providing a first signal defining a fixed time interval in response to the Q-R portion of an input signal exceeding a predetermined magnitude; second signal-generating means connected to said signal input means and providing an information signal in response to any input electrocardiograph signal changing in the R-S direction and achieving a selected amplitude; information signal-monitoring means; signal-gating means connected to said first signal-generating means for control thereby and between said monitoring means and said second signal-generating means, said signal-gating means preventing the application of an output signal to said monitoring means from said second signal-generating means during said time interval; and a third signal-generating circuit connected between said second signal-generating circuit and said signal input means and providing a control signal to said second signal-generating circuit operative to hold said second signal-generating circuit against recycling for a predetermined time following generation of a said information signal.

2. A ventricular arrhythmia detection system comprising in combination: a signal input circuit means; a first signal-generating circuit coupled with said input circuit means and responsive to the leading edge of a normal QRS electrocardiograph signal reaching a first amplitude to provide a first signal which terminates during the RS portion of a normal QRS signal; second signal-generating circuit means coupled with said input circuit means and responsive to any input signal changing in the R-S direction of a normal QRS signal reaching a second condition to provide a second signal, said second signal occurring prior to termination of said first signal for a normal QRS signal and subsequent thereto for a QRS signal having a duration longer than normal; signal-gating circuit means connected to each of said signal-generating circuit means and providing an information signal only in response to the occurrence of said second signal during the absence of said first signal; alarm circuit means connected to said signal-gating circuit means and responsive to information signals therefrom and signal display means including an oscilloscope connected to said input circuit means and having beam deflection control circuits coupled with said first and second signal-generating circuit means to provide horizontal visual markers on the QRS wave of an electrocardiograph signal upon the occurrence of said first and second signals.

3. The system of claim 2 including a third signal-generating circuit connected between said input circuit means and said second signal-generating circuit means and providing a signal which first triggers said second signal-generating circuit means and then holds the same against further triggering for a predetermined time.